(12) United States Patent
Shimoni (10) Patent No.: US 11,842,233 B2
(45) Date of Patent: Dec. 12, 2023

(54) DIGITAL PRINTING DEVICE COMPRISING MEANS FOR ADJUSTMENT OF THE PRINTED IMAGE TO THE FABRIC COLORS

(71) Applicant: Kornit Digital Ltd., Rosh HaAyin (IL)

(72) Inventor: Allon Shimoni, Modiin-Maccabim-Reut (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 17/762,063

(22) PCT Filed: Sep. 22, 2020

(86) PCT No.: PCT/IL2020/051030
§ 371 (c)(1),
(2) Date: Mar. 20, 2022

(87) PCT Pub. No.: WO2021/059265
PCT Pub. Date: Apr. 1, 2021

(65) Prior Publication Data
US 2022/0374661 A1 Nov. 24, 2022

Related U.S. Application Data

(60) Provisional application No. 62/905,488, filed on Sep. 25, 2019.

(51) Int. Cl.
*G06K 15/02* (2006.01)
(52) U.S. Cl.
CPC ....... *G06K 15/021* (2013.01); *G06K 15/1868* (2013.01); *G06K 15/1878* (2013.01)

(58) Field of Classification Search
CPC ............. G06K 15/021; G06K 15/1868; G06K 15/1878
(Continued)

(56) References Cited

U.S. PATENT DOCUMENTS

| 2,099,211 A1 | 9/2009 | Watanabe et al. |
| 9,036,227 B2 | 5/2015 | Maheshwari |

(Continued)

FOREIGN PATENT DOCUMENTS

| EP | 2099211 | 9/2009 |
| EP | 2288137 | 2/2011 |

(Continued)

OTHER PUBLICATIONS

International Search Report and the Written Opinion dated Jan. 17, 2021 From the International Searching Authority Re. Application No. PCT/IL2020/051030. (12 Pages).

(Continued)

*Primary Examiner* — Quang N Vo (57) ABSTRACT

A textile printing system for digital printing of colored images onto typically colored fabrics, digitally using print nozzles or other digital means, the nozzles printing print pixels onto the fabrics. The system comprises a print file defining pixel colors for the individual printing pixels; and a deletion unit which deletes print pixels from the print file wherever a respective pixel color is within a threshold distance of the fabric color. The textile printer then prints the print pixels onto the fabric to form a colored image without printing any of the deleted pixels.

25 Claims, 6 Drawing Sheets

(58) Field of Classification Search
USPC .................................................. 358/1.15, 1.9
See application file for complete search history.

(56) References Cited

U.S. PATENT DOCUMENTS

| | | | |
|---|---|---|---|
| 9,269,157 B2* | 2/2016 | Saban | H04N 23/63 |
| 2007/0216921 A1 | 9/2007 | Watanabe | |
| 2016/0094746 A1* | 3/2016 | Umezawa | H04N 1/00411 |
| | | | 358/1.15 |
| 2021/0237469 A1* | 8/2021 | Zapata | B41J 3/4078 |

FOREIGN PATENT DOCUMENTS

| WO | WO 2013/179276 | 12/2013 |
|---|---|---|
| WO | WO 2019/063060 | 4/2019 |
| WO | WO 2021/059265 | 4/2021 |

OTHER PUBLICATIONS

International Preliminary Report on Patentability dated Apr. 7, 2022 From the International Bureau of WIPO Re. Application No. PCT/IL2020/051030. (5 Pages).
Supplementary European Search Report and the European Search Opinion dated Aug. 1, 2023 From the European Patent Office Re. Application No. 20868124.7. (7 Pages).

\* cited by examiner

DIGITAL PRINTING DEVICE COMPRISING MEANS FOR ADJUSTMENT OF THE PRINTED IMAGE TO THE FABRIC COLORS

RELATED APPLICATIONS

This application is a National Phase of PCT Patent Application No. PCT/IL2020/051030 having International filing date of Sep. 22, 2020, which claims the benefit of priority under 35 USC § 119(e) of U.S. Provisional Patent Application No. 62/905,488 filed on Sep. 25, 2019. The contents of the above applications are all incorporated by reference as if fully set forth herein in their entirety.

FIELD AND BACKGROUND OF THE INVENTION

The present invention, in some embodiments thereof, relates to apparatus and a method for printing with colored fabrics and, more particularly, but not exclusively, to a method that considers the color of the fabric when printing.

Color printing of an image onto a fabric may involve pretreating the fabric with a preprinting substance and may also involve drying the pretreatment substance, then printing a white undercoat and then printing the image itself. The fabric on which the printing itself is carried out may be colored and considerable ink and preprinting substance may be saved by not printing those parts of the image that are the same color as the fabric.

The currently known method of deleting the fabric color is simply to take the digital source image and delete all pixels that are the same color as the fabric and then feed that source image into the printer. The print program then has to work out where not to apply the background and the other processes. As the deletion is carried out on the source image without reference to the physical layout properties of the printer, the deleted pixels in the source image only approximate to the pixels actually used by the printer for printing the image. The approximation can have side-effects, so that for example the white undercoat, which the printer removes, may not align exactly with the color region that has been removed and unwanted background may show through. The different print colors, say Cyan, Magenta, Yellow and Black, may be approximated differently on the edge of the deleted zone, causing an umbra of miscoloring around the edge of the deleted area. Side-effects may include noticeable degrading of outline shapes of image parts around the deleted regions, in particular if the areas being deleted are critical areas of the image. The problem is compounded in that the manual deletion process has to be done separately each time a new colored fabric is introduced, requiring considerable image editing each time, and human error may be introduced when judging whether a colored area is the same as that of the fabric and can safely be removed.

Furthermore, in textile printing the color of the textile may have inaccurate color even in the same batch of fabric due to the manufacturing and dyeing processes of the fabric, compounding the scope of human error.

WO2019/063060 teaches printing a target image and then using a color measurement device to detect differences between the target image and the printed image. The color of the printing substrate may also be detected, and then a modification of the target image may be made to reduce the differences so that further prints of the image are closer to the original target.

However WO2019/063060 prints all of the pixels and thus the printed substrate is used only for scanning and cannot be used or sold. The procedure is needed on each new color substrate. As mentioned, in the textile industry the color of the fabric may be inaccurate and the substrate itself is expensive.

SUMMARY OF THE INVENTION

The present embodiments carry out all editing, not on the source file but on the print file, and use a color measurement device to measure the color of the fabric, so that the entire color deletion process is carried out within the scope of the individual printer. Thus the step of approximating between image pixels and printer pixels is obviated. The image may be better adapted to the specific colored fabric.

The system may allow the user to set certain parameters. For example the user may set a maximum distance (dE) between the image color and the fabric color to be recognized as the same color. Likewise the user may set an option to print the surface color but not the undercoat, say to give the image a consistent surface.

According to an aspect of some embodiments of the present invention there is provided a textile printing system for digital printing of colored images onto fabrics digitally using print pixels, the system comprising:
  a print file defining pixel colors for ones of the printing pixels; and
  a deletion unit configured to delete print pixels from the print file wherever a respective pixel color is within a threshold distance of a fabric color of an incoming fabric; the textile printer thereby printing the print pixels onto the fabric to form a colored image without printing the deleted pixels.

Embodiments may comprise a color measurement input configured to measure a fabric color of the incoming fabric and provide the measurement to the deletion unit.

In an embodiment, the color measurement input is configured to receive input from an operator.

In an embodiment, the color measurement input is connected to a color measurement device, the color measurement device being configured to measure incoming garments.

Embodiments may print an undercoat using undercoat print pixels and print color image print pixels over the undercoat.

In an embodiment, the deleted print pixels comprise undercoat print pixels.

In an embodiment, the printer is configured to print color image print pixels over the deleted undercoat print pixels.

In an embodiment, the deleted print pixels comprise both undercoat print pixels and color image print pixels.

Embodiments may print a preprinting fluid onto the incoming fabric using preprinting fluid print pixels. The deleted pixels may in such a case comprise preprinting fluid print pixels.

The deleted print pixels may comprise both undercoat print pixels and color image print pixels.

In an embodiment, a printer driver may receive an image source file having image pixels, and convert the image file into the print file.

Embodiments may comprise a textile printing apparatus configured to print fabrics using the printing system described above.

Such a textile printing apparatus may receive the print file from a printer driver located on a connected computing apparatus.

According to a second aspect of the present invention there is provided a method for digital printing of colored images onto fabrics using print pixels, the print pixels corresponding to printing parameters of a respective printer, the method comprising:

defining pixel colors for ones of the printing pixels; and deleting print pixels wherever a respective pixel color is within a threshold distance from a fabric color of an incoming fabric; and printing the print pixels onto the incoming fabric to form a colored image without printing the deleted pixels.

The threshold distance may have a dE of ten or less.

The method may comprise measuring a fabric color of the incoming fabric and providing the measurement for the deleting.

The method may comprise printing an undercoat using undercoat print pixels and printing color image print pixels over the undercoat.

The method may comprise receiving an image file having image pixels, and converting the image pixels into the printing pixels.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

A textile printing system relates to digital printing of colored images onto typically colored fabrics. Printing is digital, using print nozzles or other digital means, the nozzles printing print pixels onto the fabrics. The system comprises a print file which defines pixel colors for the individual printing pixels; and a deletion unit which deletes print pixels from the print file wherever a respective pixel color is within a threshold distance of the fabric color. The textile printer then prints the print pixels onto the fabric to form a colored image without printing any of the deleted pixels.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
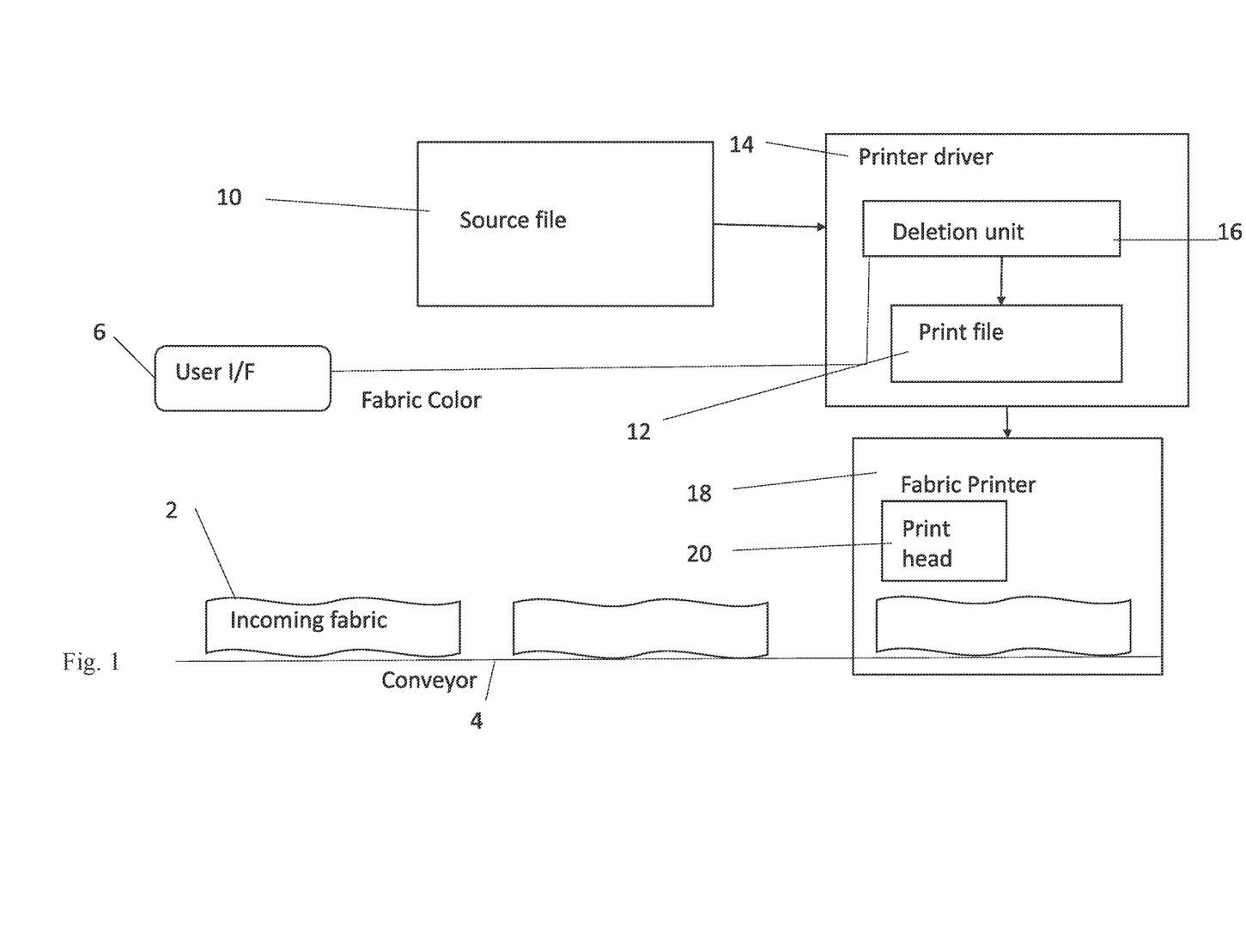
FIG. 1 is a simplified block diagram illustrating an embodiment of the present invention in which a source image file is converted into a print file at a printer driver, certain pixels are deleted and the image is printed on a fabric.

Referring now to the drawings, FIG. 1 is a simplified block diagram that illustrates a textile printing system for digital printing of colored images onto incoming fabrics 2, typically being supplied on conveyor or printing pallets 4. The printing involves digital printing using print nozzles or like digital printing apparatus in which individual pixels are printed. The nozzles print the individual pixels onto the fabrics. Typically an image to be printed is received in a source file 10 which is itself a digital image and includes pixels. However the pixels in the source image are generally designed for screen display on a standard screen. The pixels as displayed on a standard screen are sized for typical screen resolutions and colors and are not the same as the pixels involved in printing. Furthermore the pixels for printing may vary between individual printers due to different specifications, including nozzle sizes and layouts of the individual printer. Thus the screen and printer resolutions may differ, and furthermore, the colors are not usually specified in the same way. Thus the source file is likely to specify the colors using RGB color coordinates, whereas the printer is likely to specify using CMYK. Some printers may even use non-standard color coordinate systems and non-standard numbers of colors. Hence the source file is typically converted into a print file 12 which defines an image suitable for use by the individual printer. The conversion is generally carried out using a printer driver 14 which incorporates settings that are specified for the individual printer.

Often, the fabric being printed on is colored, and in the embodiment of FIG. 1, the user may enter the fabric color to the system via interface 6, either based on information provided or based on a color measurement. Often the image being printed is coordinated with the fabric color, resulting in parts of the image which are the same color as the fabric. In other cases, color similarities may be purely coincidental. In the present embodiments, a deletion unit 16 deletes print pixels from the print file 12 whenever a particular pixel has a color that is within a threshold distance from a fabric color of the incoming fabric. The textile printer 18 uses the print file to operate print head 20 in the normal way to print the image onto the fabric and the printing process forms a colored image without printing the deleted pixels. This may save quantities of colored ink and further may have the aesthetic effect of making the image appear to merge with the fabric.

As illustrated, the deletion unit 16 is shown as part of the printer driver. However it may also be provided as a separate integer.

It is noted that the deletion of the pixels according to the present embodiments is carried out on the printing pixels in the print file and not on the image pixels in the source file, thus avoiding the side effects referred to in the background, particularly side effects to do with averaging over misalignments. For example, if the image pixels are deleted first and then the conversion is carried out at the printer driver, then converting between image and print pixels across a misalignment may cause the printer driver to derive a print pixel color by averaging the color between an image pixel which is present and an image pixel which has been deleted, the result being to produce a print pixel which is the wrong color. By contrast in the present embodiments the print pixels are constructed directly from the intact image file and then deleted individually as necessary.

Figure 2:
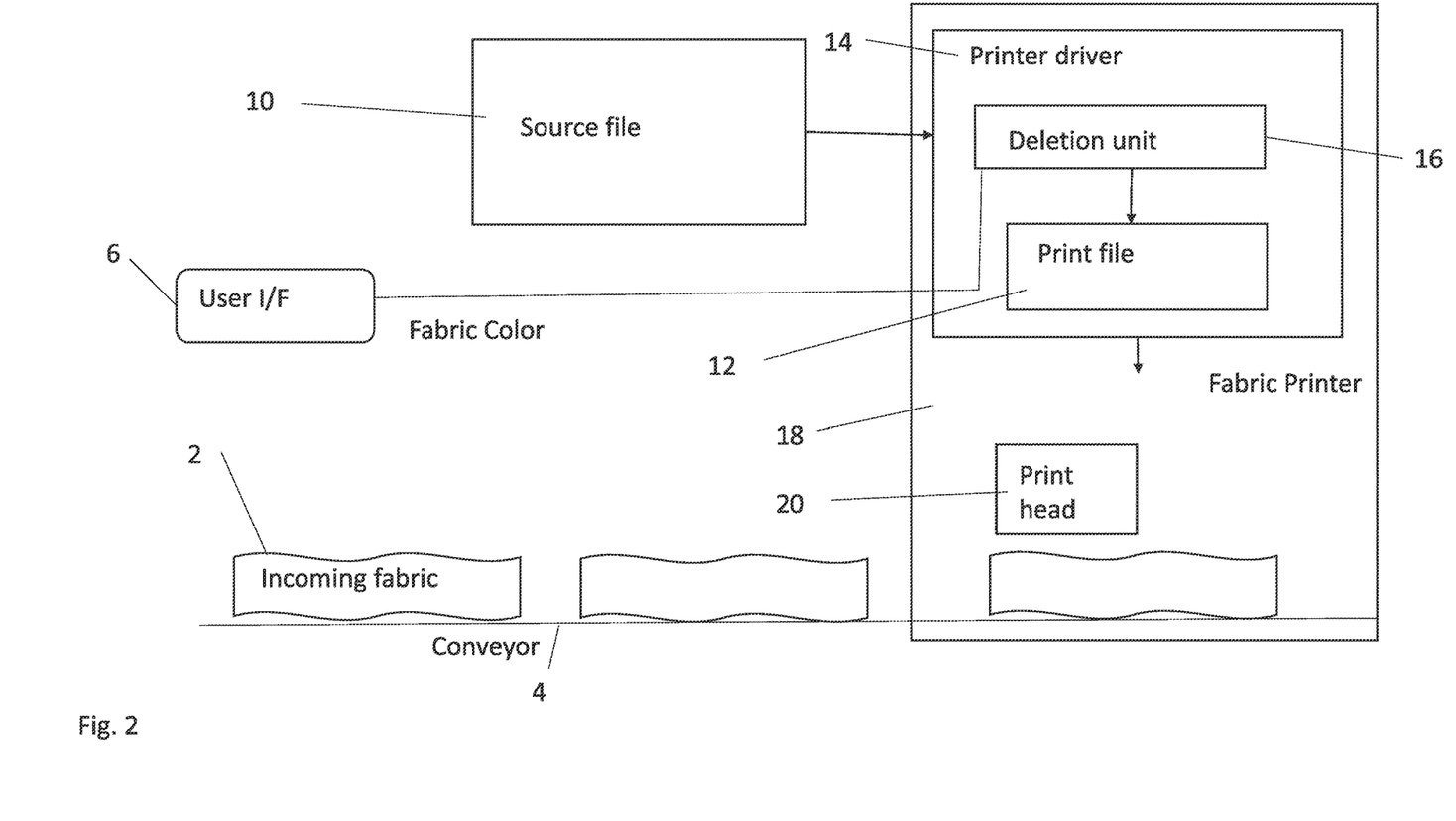
FIG. 2 is a variation of the embodiment of FIG. 1 in which the printer driver is built into the printer.

As shown in FIG. 1, the printer driver is external to the printer, typically located on a computer that is connected to the printer. FIG. 2 illustrates a variation of the arrangement of FIG. 1 in which the printer driver is internal to the printer. Parts that are the same as in the embodiment of FIG. 1 are not described again except as necessary for an understanding of the present embodiment. In some cases a combination of external and internal printer drivers 14 may be used, since the external computer may often have a generic version of the printer driver which does not include the deletion unit 16. As a further alternative, the printer driver may reside on an external computer but the deletion unit may reside on the printer.

Figure 3:
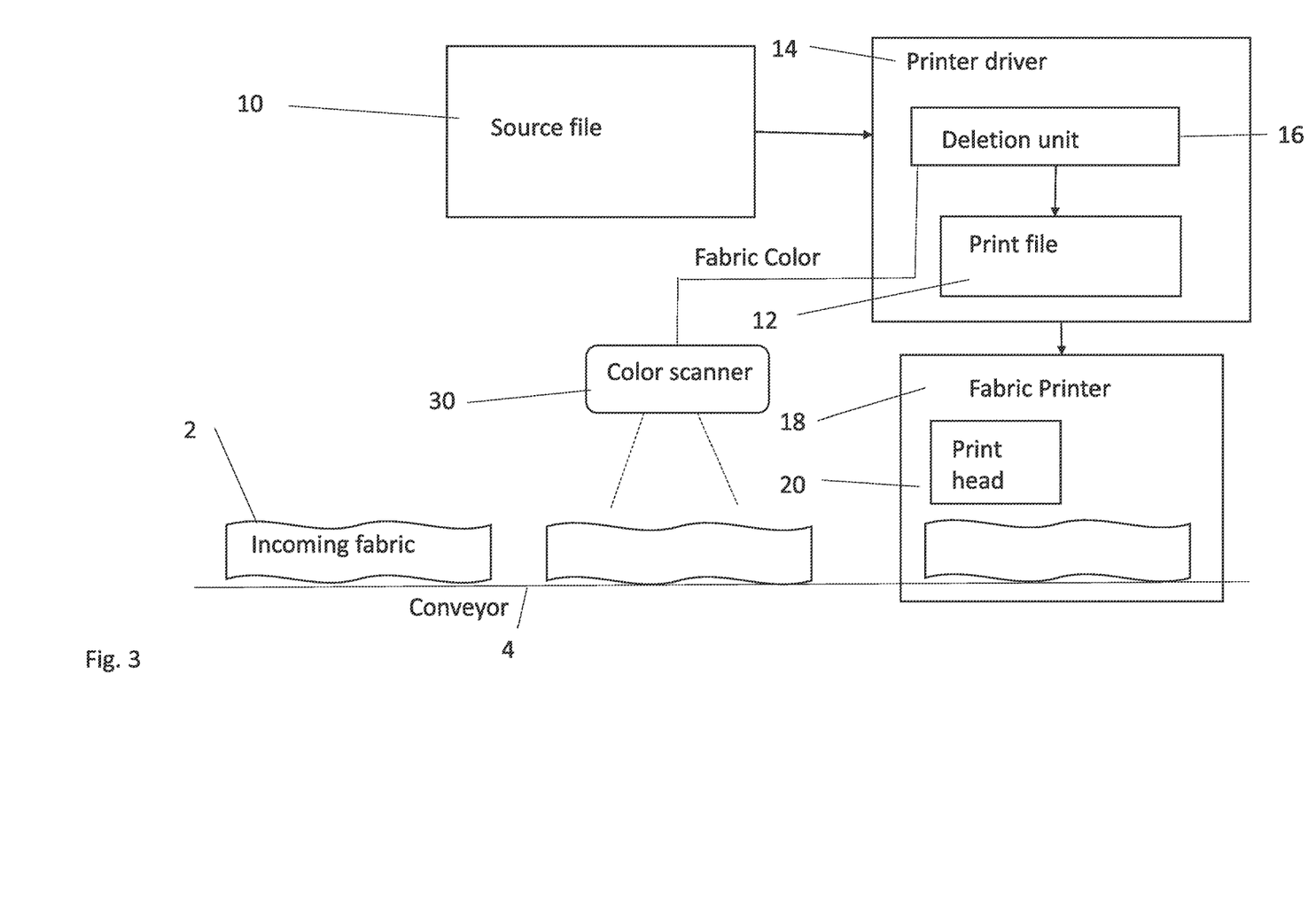
FIG. 3 is a variation of the embodiment of FIG. 1 in which a color measurement device is connected to automatically obtain the color coordinates of the incoming fabric.
Figure 4:
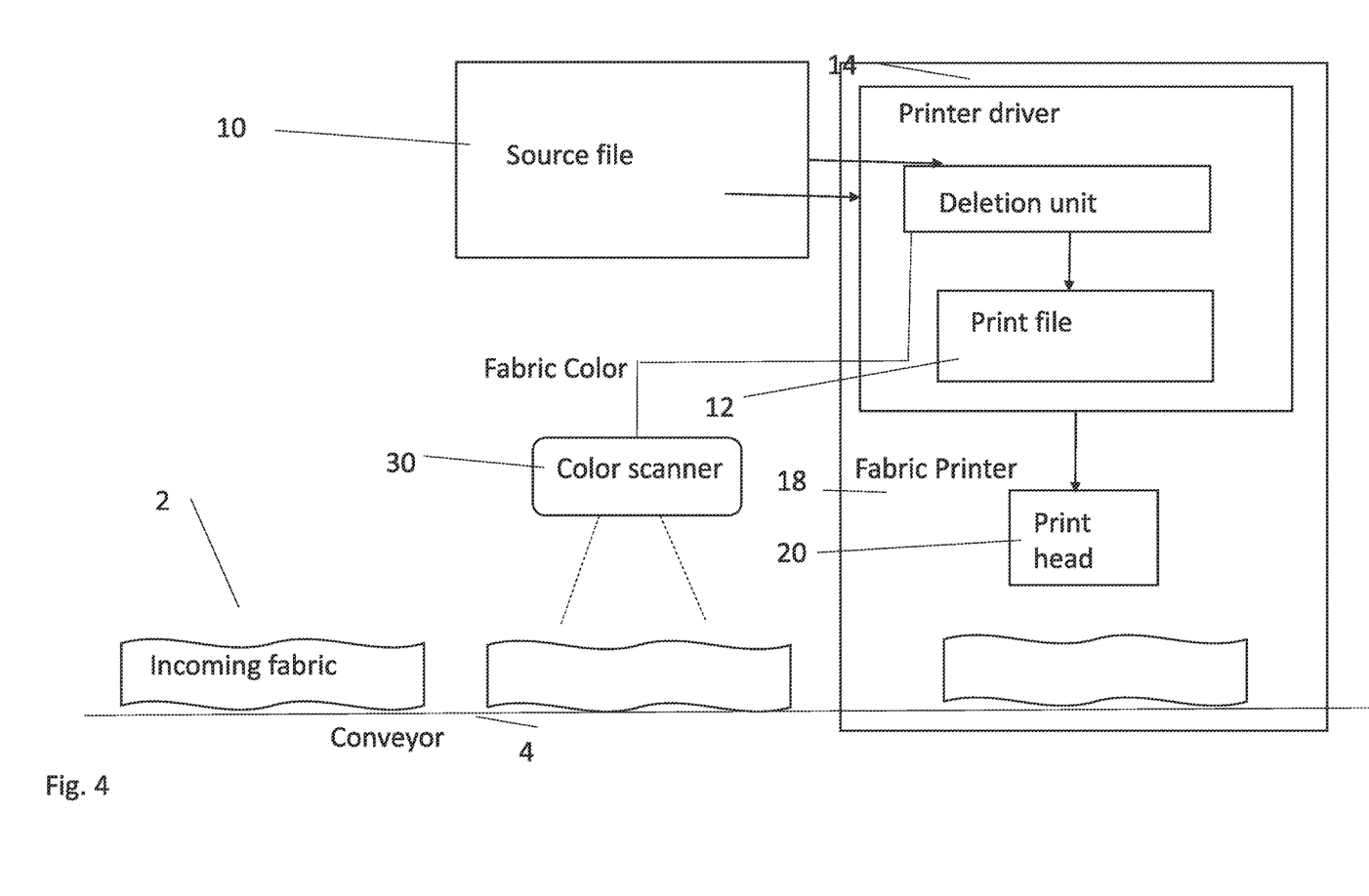
FIG. 4 is a variation of the embodiment of FIG. 3 in which the printer driver is built into the printer, allowing the color measurement device to also be included in the printer.

Reference is now made to FIG. 3, which illustrates a further embodiment of the present invention. In FIG. 3 a color measurement device 30 is connected to a color measurement input of the printer driver to measure the colors of incoming fabrics 2 as they approach. The measurement may be done manually by the user with a color measurement device or the color measurement device may be automated in the printer. The measurement is sent directly to the deletion unit which is thus able to calculate distances in color coordinates to the printing pixels dynamically. Thus when the color measurement device may is automated in the printer. The deletion system may work automatically without needing intervention from the operator and the system may react to small color variation in batches of fabrics that the operator may not notice. As above, the printer driver may be on a separate computer as shown in FIG. 3 or may be part of the printer machine 18 as shown in FIG. 4. Likewise the deletion unit may either reside on a separate computer (FIG. 3) or may reside in the printer (FIG. 4). If the deletion unit is on a separate computer (FIG. 3) then the color measurement device may be directly connected to the separate computer. Alternatively, the printer may communicate the color coordinates from the measurement device to the external computer for use by the deletion unit. It is noted that the color measurement device may be a spectrometer or a scanner or any other suitable color measurement device.

Returning now to the print file and the processing carried out to generate the print file, it is often found necessary or useful to print an undercoat before printing the image. For example before printing on black, a white undercoat may be printed. The printer driver defines undercoat pixels that are to be printed, ensures that the undercoat and image align and prints the color print pixels over the undercoat, the necessary information being stored in the print file.

In the present embodiments, some of the deleted print pixels may be undercoat print pixels.

In one embodiment, the pixels that are deleted are entirely undercoat pixels. The undercoat is often only needed for dark colors. If different colored fabrics are being printed together, then the operator is saved the trouble of specifying each time whether an undercoat is needed.

In one embodiment, the undercoat is not printed if the fabric color is close to the pixel color, but the pixel color is printed, so that the entire image has the same surface effect.

Retaining or removal of the undercoat may be based on the measured distance between the fabric and pixel color in combination with settings added by the user.

Thus in any case where the fabric does not need an undercoat, the printer using the present embodiments may print color image print pixels over deleted undercoat print pixels. In some cases the deleted pixels may be undercoat pixels only and in other cases the deleted pixels may be both undercoat print pixels and color image print pixels.

Often, in textile printing processes, a preprinting fluid is applied to the fabric and may also be dried before printing the image. The preprinting fluid may fulfil several functions, including setting the pH correctly for the ink, and saturating the fibers to prevent wicking of the ink and other undesirable effects. The preprinting fluid may be printed onto the incoming fabric using the printing nozzles or other means and defined preprinting fluid print pixels, and the preprinting fluid pixels may likewise be deleted where not needed. Thus deleted print pixels may be any or all of undercoat, color and preprinting fluid pixels.

Figure 5:
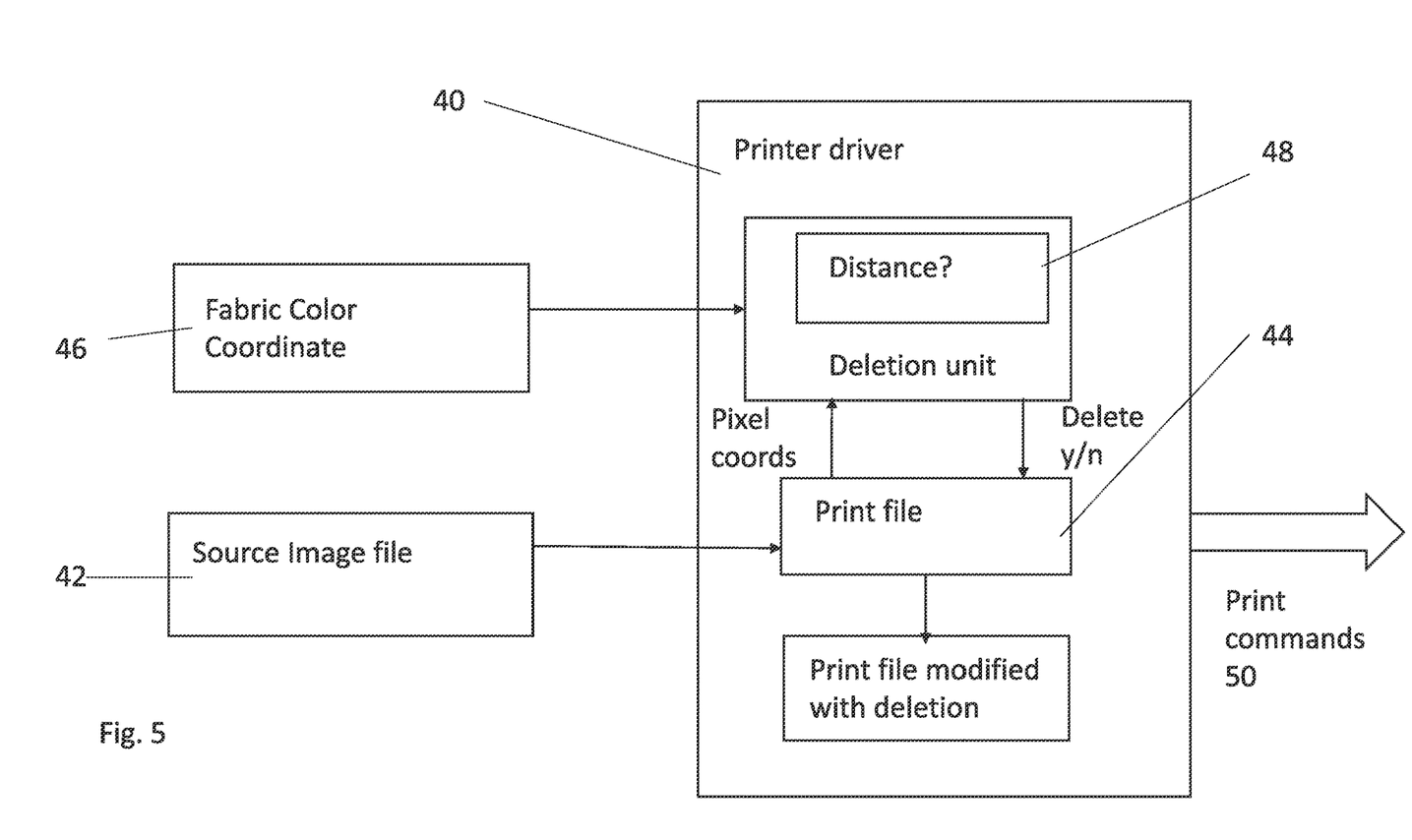
FIG. 5 is a simplified diagram showing in greater detail a printer driver according to the present embodiments.

Reference is now made to FIG. 5, which is a simplified block diagram illustrating a printer driver 40 according to an embodiment of the present invention. The printer driver receives an image file 42 having image pixels, and converts the image file into a print file 44 having print pixels at the resolution and printing configuration of the printer and which use the color coordinate system of the printer. An input receives fabric color coordinate 46 and deletion unit 48 calculates a distance between the input coordinate and the color in each individual print pixel. For each print pixel, whether color pixel or undercoat pixel or preprinting fluid pixel, the print file is modified for any deletions made and print commands 50 are issued accordingly.

Figure 6:
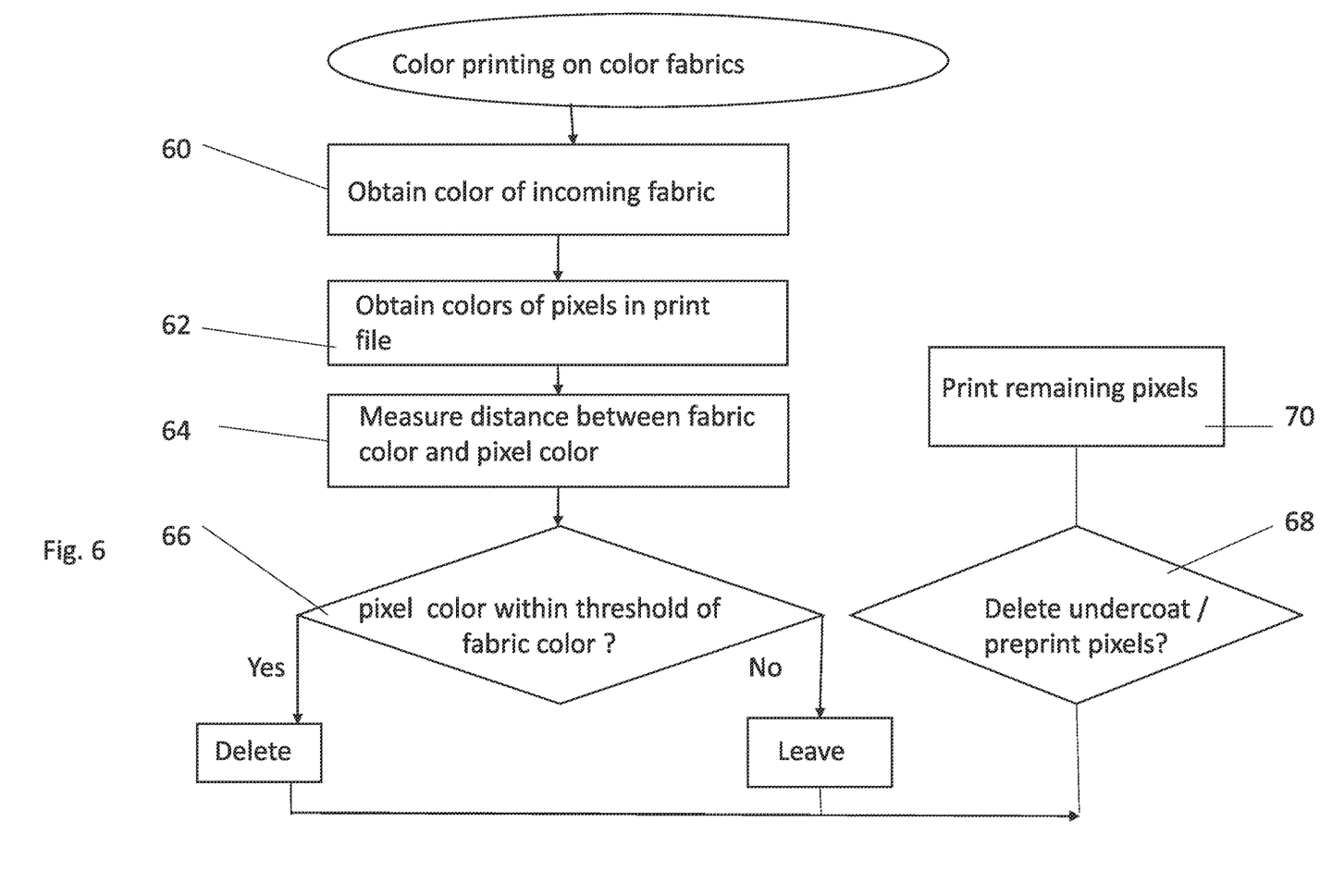
FIG. 6 is a simplified flow chart illustrating a process for modifying the print file for textile printing according to embodiments of the present invention.

Reference is now made to FIG. 6, which is a simplified flow chart illustrating a method for digital printing of colored images onto fabrics using print pixels. As explained, the print pixels correspond to nozzle parameters of the particular printer being used. The printer driver may define the pixel colors for individual printing pixels using the printer's color coordinate system using the relevant pixels in the source file and without carrying out deletions on pixels on the source image. The system may obtain 60 the color coordinates of the incoming fabric, obtain 62 the colors of individual pixels in the print file, measure 64 the distance between the colors of the fabric and the print pixel then, using decision box 66, delete print pixels wherever the pixel color is within a threshold distance of the fabric color. In addition, undercoat and preprint pixels may be deleted—box 68. The same distance measure is used in box 68 as in box 66 although the decision criteria may be different. Finally, the remaining pixels are printed onto the incoming fabric to form a colored image in a normal printing procedure which may involve, preprinting, printing the undercoat and then printing the image, without printing the deleted pixels.

The user may choose a threshold for the amount pixels in a group to be deleted—in some cases the user may choose not to delete small areas even if it is within the threshold—this is a design effect as well. For example—if a single color pixel is deleted but is the only deleted pixel at the given location, the user may prefer to have a uniform film without holes even if this results in greater ink cost. The user may thus be provided with the ability to choose the minimum size of any deleted area, as well as particular minimum dimensions, for example a thin unprinted line may not be acceptable whereas a square or round unprinted region having the same area may be acceptable.

In the above discussion, mention is made of thresholding colors according to distance. In general color coordinates of three or four dimensions are used, but in some specific printers, more coordinates may be used. A threshold may be calculated based on a Pythagorean distance between the coordinates. In many cases, in color management, distances are defined using dE which is the three-dimensional distance of CIE L*ab color coordinates. Both the colors and the distances between them may be calculated suing the color coordinates such as CIE L*Ch. A typical threshold that may be selected would be to require that dE is less than 10 for deletion.

It is expected that during the life of a patent maturing from this application many relevant textile printing technologies will be developed and the scopes of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A textile printing system for digital printing of colored images onto fabrics digitally using print pixels, the system comprising:
   a textile printer, the print pixels corresponding to printing parameters of said textile printer;
   a processor;
   memory;
   a print file associated with said memory, said print file defining pixel colors for ones of the printing pixels; and
   a deletion unit configured to delete print pixels from said print file wherever a respective pixel color is within a threshold distance of a fabric color of an incoming fabric; the textile printer configured to use said print file after operation by said deletion unit to print said print pixels onto said fabric to form a colored image without printing said deleted pixels.

2. The textile printing system of claim 1, further comprising a color measurement input configured to measure a fabric color of said incoming fabric and provide said measurement to said deletion unit.

3. The textile printing system of claim 2, wherein said color measurement input is configured to receive input from an operator.

4. The textile printing system of claim 2, wherein said color measurement input is connected to a color measurement device, the color measurement device being configured to measure incoming garments.

5. The textile printing system of claim 1, configured to print an undercoat using undercoat print pixels and to print color image print pixels over said undercoat.

6. The textile printing system of claim 5, wherein said deleted print pixels comprise undercoat print pixels.

7. The textile printing system of claim 6, wherein said printer is configured to print color image print pixels over said deleted undercoat print pixels.

8. The textile printing system of claim 5, wherein said deleted print pixels comprise both undercoat print pixels and color image print pixels.

9. The textile printing system of claim 5, configured to print a preprinting fluid onto said incoming fabric using preprinting fluid print pixels.

10. The textile printing system of claim 9, wherein said deleted pixels comprise preprinting fluid print pixels.

11. The textile printing system of claim 10, wherein said deleted print pixels further comprise both undercoat print pixels and color image print pixels.

12. The textile printing system of claim 1, comprising a printer driver configured to receive an image source file having image pixels, and to convert said image file into said print file.

13. A textile printing apparatus configured to print fabrics using the printing system of claim 1.

14. The textile printing apparatus of claim 13, configured to receive said print file from a printer driver located on a connected computing apparatus.

15. A method for digital printing of colored images onto fabrics using print pixels, the print pixels corresponding to printing parameters of a respective printer, the method comprising:
   defining pixel colors for ones of the printing pixels; and
   deleting print pixels wherever a respective pixel color is within a threshold distance from a fabric color of an incoming fabric; and
   printing said print pixels onto said incoming fabric to form a colored image without printing said deleted pixels.

16. The method of claim 15, wherein said threshold distance is a dE of ten or less.

17. The method of claim 15, further comprising measuring a fabric color of said incoming fabric and providing said measurement for said deleting.

18. The method of claim 15, comprising printing an undercoat using undercoat print pixels and printing color image print pixels over said undercoat.

19. The method of claim 18, wherein said deleted print pixels comprise undercoat print pixels.

20. The method of claim 19, comprising printing color image print pixels over said deleted undercoat print pixels.

21. The method of claim 18, wherein said deleted print pixels comprise both undercoat print pixels and color image print pixels.

22. The method of claim 18, comprising printing a preprinting fluid onto said incoming fabric using preprinting fluid print pixels.

23. The method of claim 22, wherein said deleted pixels comprise preprinting fluid print pixels.

24. The method of claim 23, wherein said deleted print pixels further comprise both undercoat print pixels and color image print pixels.

25. The method of claim 15, comprising receiving an image file having image pixels, and converting said image pixels into said printing pixels.

* * * * *